H. A. HERR.
CONTINUOUS AUTOMATIC CENTRIFUGAL FILTERING MACHINE.
APPLICATION FILED DEC. 23, 1915.

1,286,626.

Patented Dec. 3, 1918.
8 SHEETS—SHEET 1.

Witnesses:
M. W. Herr
M. A. Detwiler

INVENTOR.
Homer A. Herr

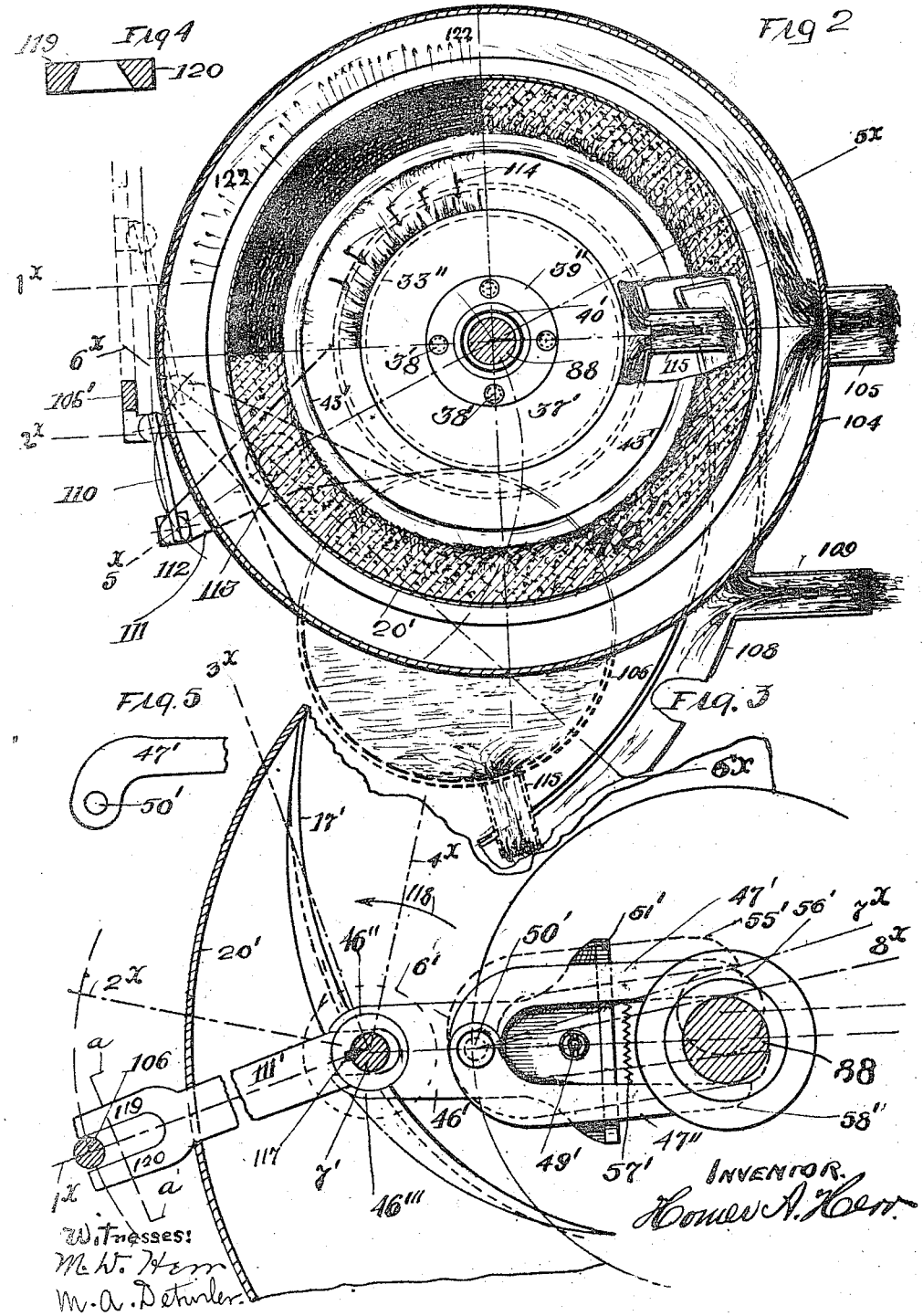

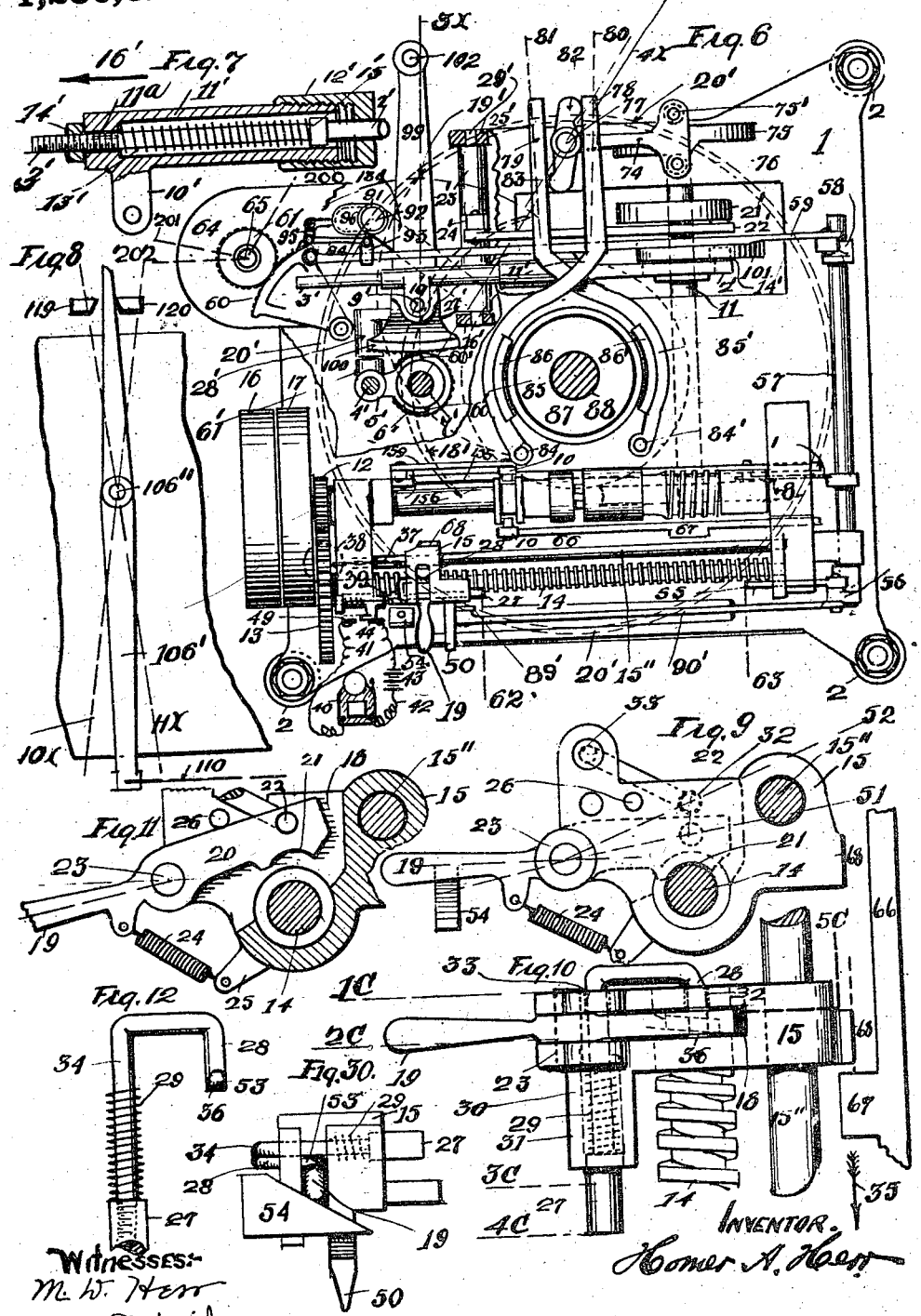

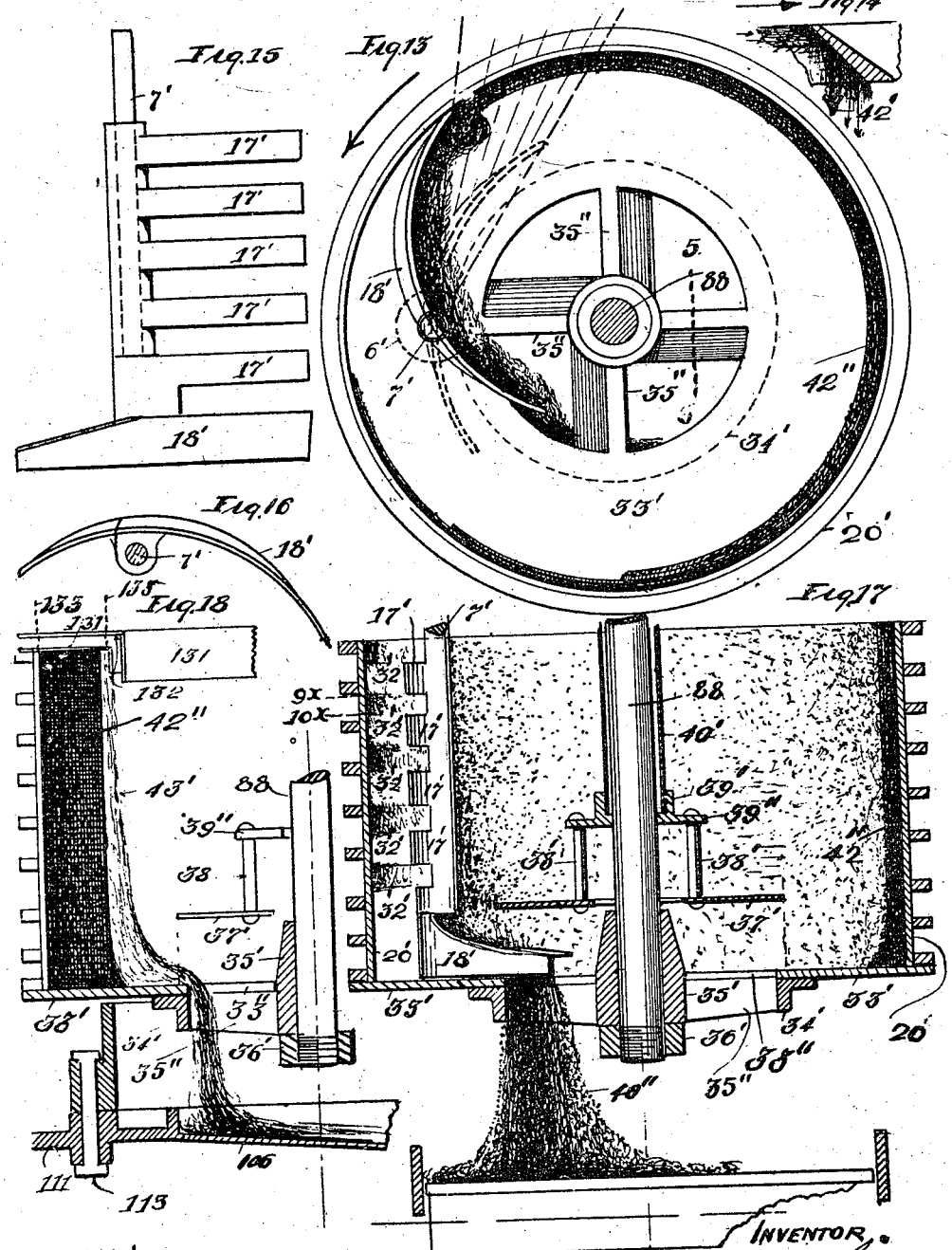

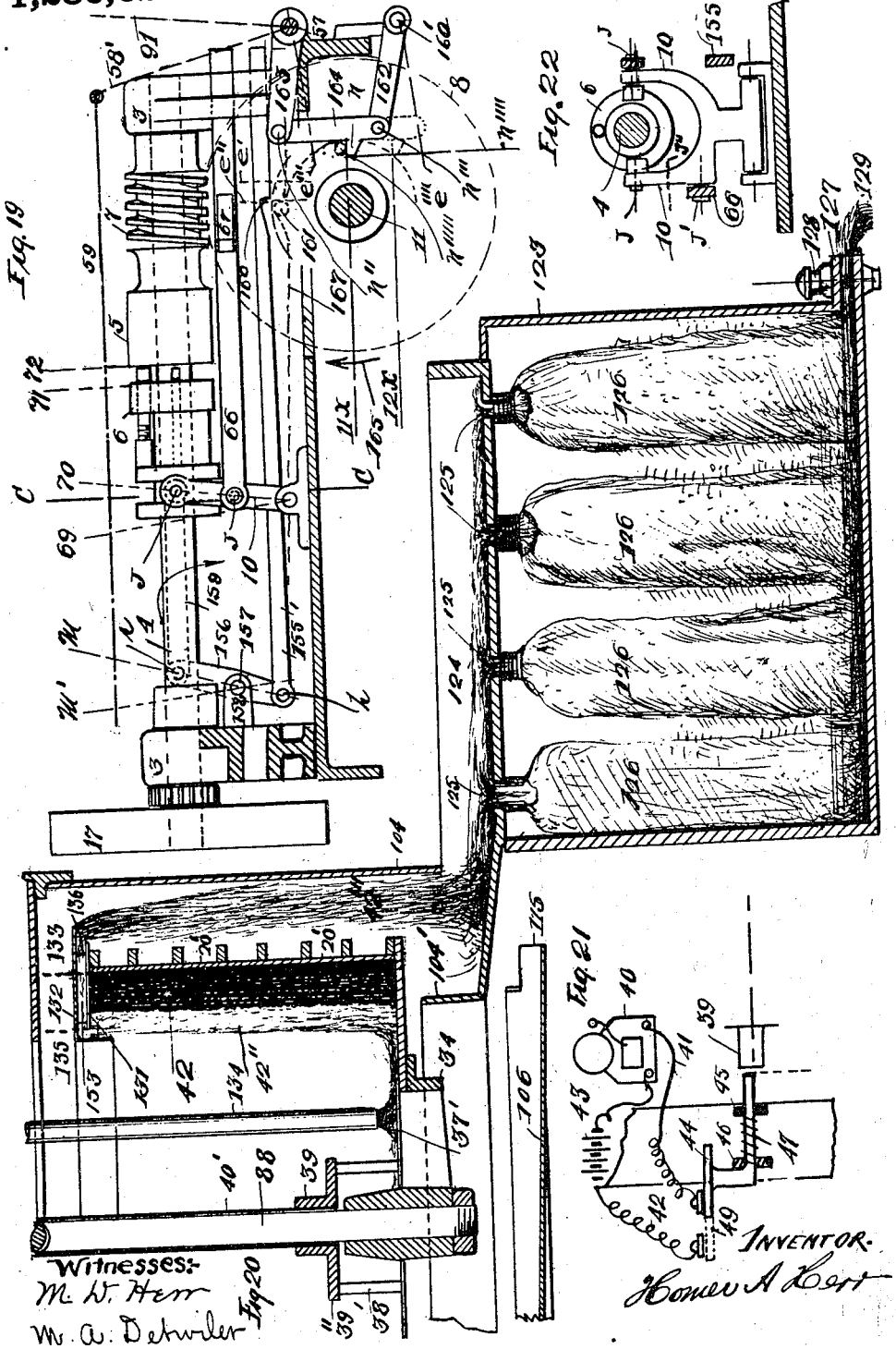

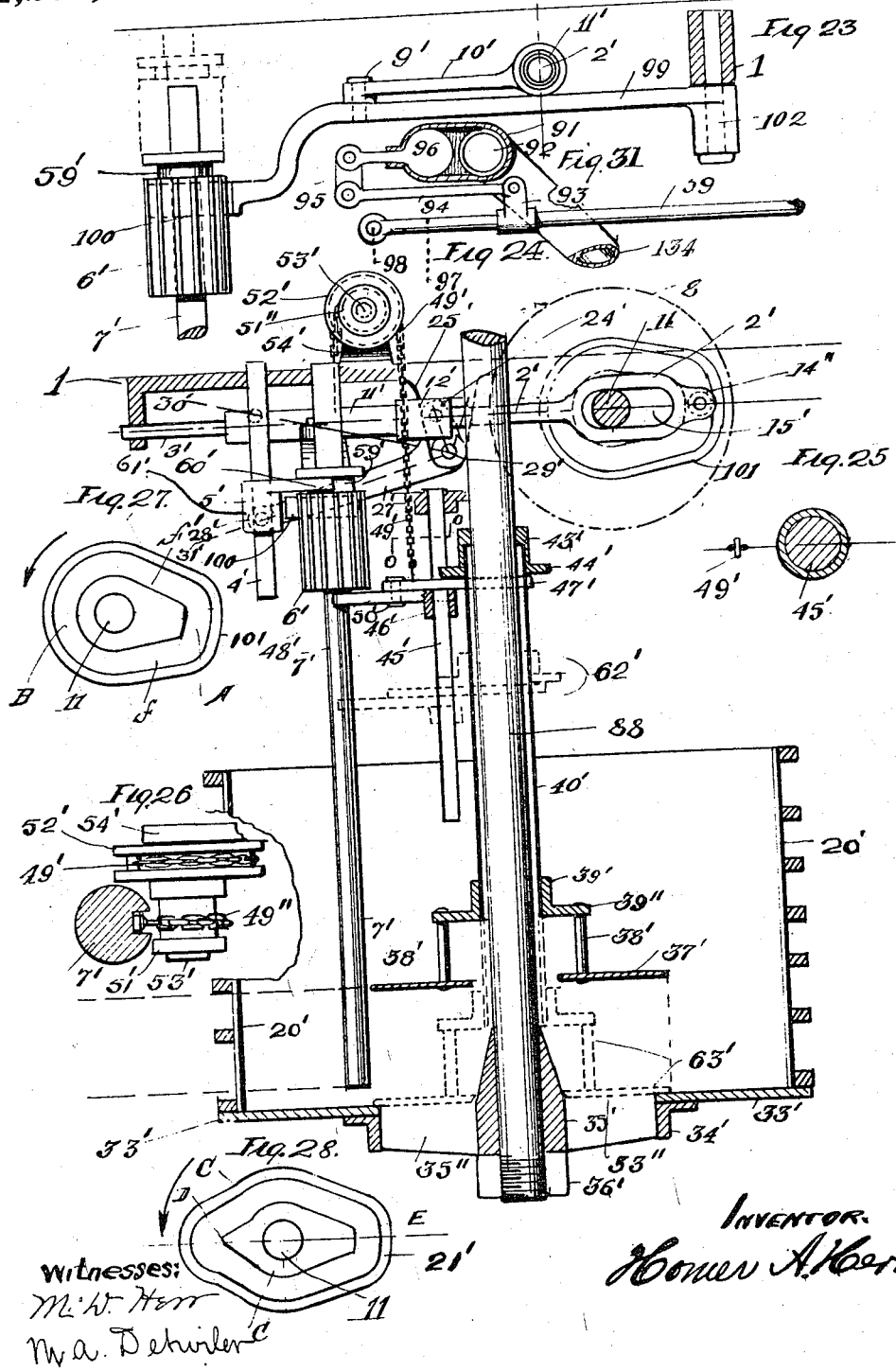

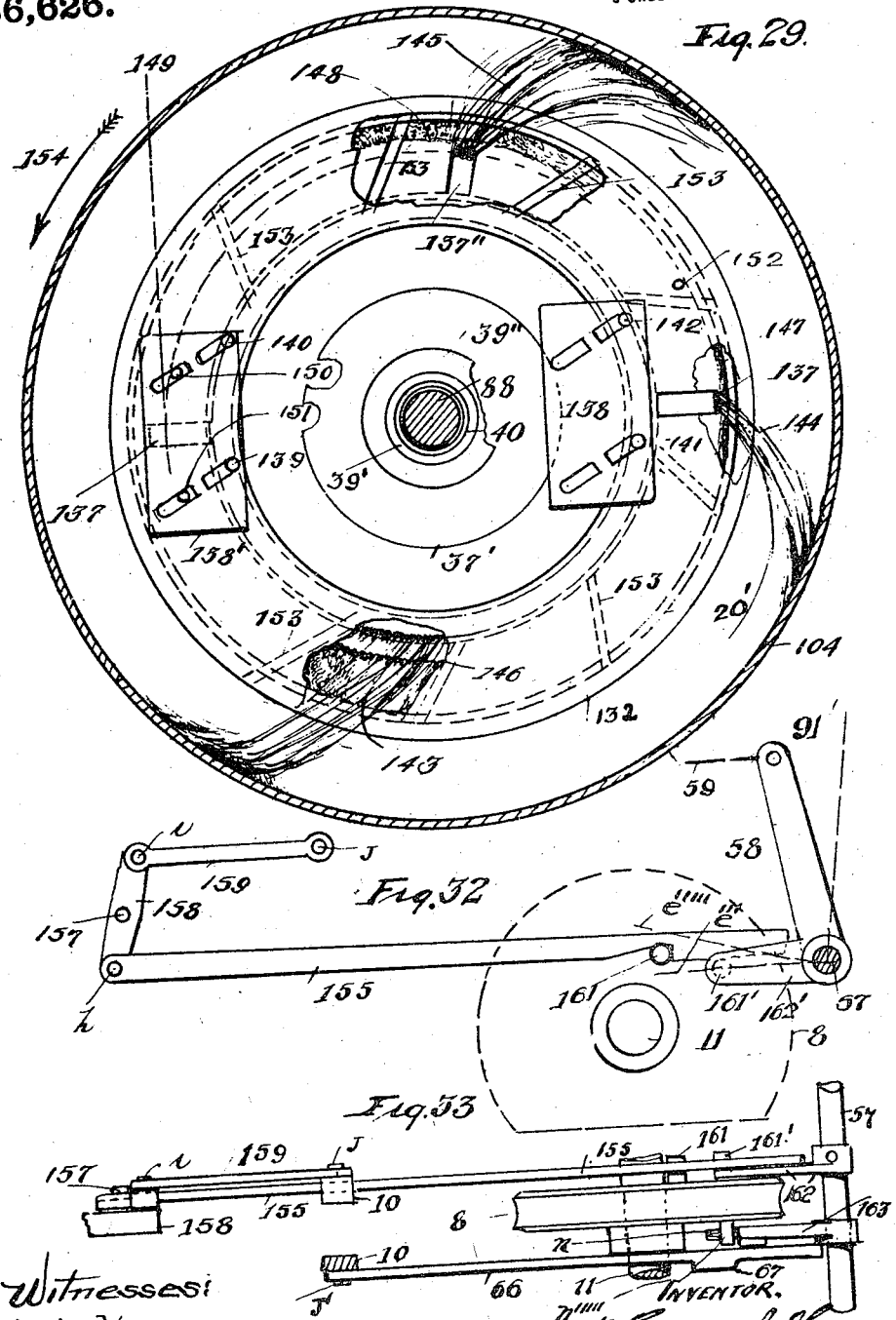

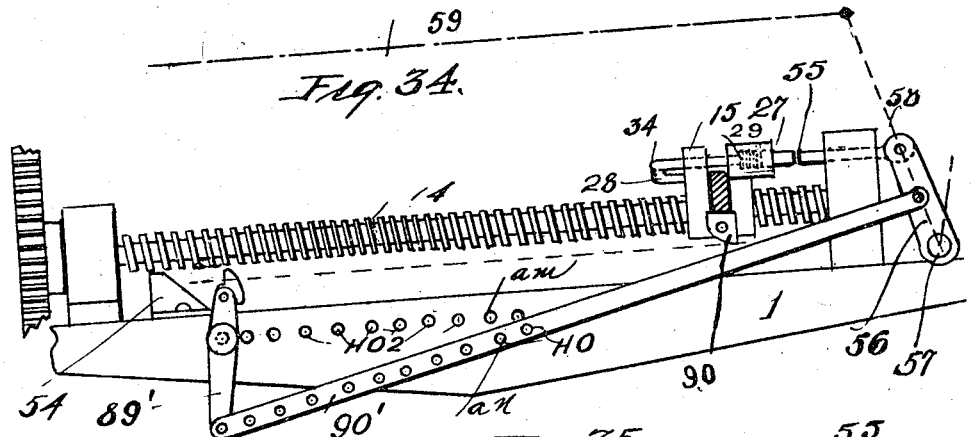
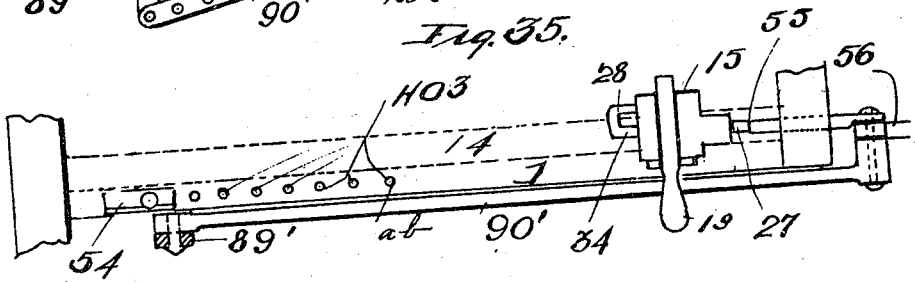
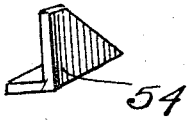

UNITED STATES PATENT OFFICE.

HOMER A. HERR, OF PHILADELPHIA, PENNSYLVANIA.

CONTINUOUS AUTOMATIC CENTRIFUGAL FILTERING-MACHINE.

1,286,626.

Specification of Letters Patent. Patented Dec. 3, 1918.

Application filed December 23, 1915. Serial No. 68,436.

*To all whom it may concern:*

Be it known that I, HOMER A. HERR, a citizen of the United States, residing at Philadelphia, in the county of Philadelphia and State of Pennsylvania, have invented certain new and useful Improvements in Continuous Automatic Centrifugal Filtering-Machines, of which the following is a specification.

My invention has reference to centrifugal separating machines and consists of features fully set forth in the following specification and accompanying drawing forming part thereof.

In my application No. 867,450 filed Oct. 19, 1914, I show an automatic continuous separating centrifugal machine having an unperforated basket and designed to pass the separated liquid up, out and over the basket top after being retained therein for a predetermined time.

This present invention has for its object an improvement on the invention set out in the application referred to and consists of the following features.

1st. In the application referred to and in my application No. 454,063, filed Sept. 21, 1908 I show a method of discharging purged solids by centrifugal force, or the force acquired by rotation. In the application of centrifugal force for this purpose I drop the bottom of the basket and expose ports in the basket shell through which the separated solids are discharged after being placed on said bottom.

In the present invention I use the force acquired by rotation, as in the former application, but I do not pass the solids through ports in the basket shell; instead I open a port in the bottom and sweep the separated solids from the shell wall to this port and thus pass them from the basket.

I prefer that this port for discharging the solids shall be arranged concentrically with the basket shaft, but not essentially so. It is sufficient for the purpose of my invention that the seal for this is moved exposing thereby the outlet port for passing the solids from the basket.

A second feature of my present invention is a sweep normally out of the centrifugal zone of action but brought into action while the port is exposed and carrying or forming a conductor for the solids, conducting them from the basket shell to the aforesaid exposed port and out of the basket.

A third feature of my invention is a supplemental liquid collector for receiving unseparated material remaining in the basket after a purging or separating period has expired as predetermined. It will be understood that this present invention contemplates the use of an unperforated basket shell and is designed for unseparated material where the solids are held in suspension, and where some of the solids may be lighter than the liquid and some heavier. The lighter solids are carried away with the liquid, and the heavier solids are impacted on the inner wall of the basket shell until a predetermined wall thickness results after which they are discharged as will be described hereinafter.

This supplemental liquid collector is designed to collect the wall of liquid which rests on the wall of separated solids impacted on the basket shell, and to prevent the liquid from passing on or over the separated solids by conducting it away from the zone of solids discharge, and then A fourth feature of my invention is to remove the supplemental collector away from the path of the solids as they are discharged from the machine.

Needless to say that, as in my former inventions, I use two speeds, a high purging speed of from 900 to 1600 R. P. M. and a slow speed of 100 R. P. M. while the sweep is in action.

The means for controlling these two speeds does not materially differ from that of my former inventions.

A fifth feature of my invention is a simplified timing device comprising a worm in continuous action and a carrier having a finger for indicating the period for separation.

A sixth feature of my invention is a signal or bell which announces the conclusion of a cycle and which is operated by an adjustable member on the indicator carrier on its return to a normal setting.

A seventh feature of my invention is to provide a drain for passing the liquid coming from the machine, that may carry in suspension some solids of lighter specific gravity than the liquid, and if so, to separate them by filter fabric. Usually where the solids held in suspension are of two different densities the lighter is very small in volume compared to the heavier, therefore the bag filters will permit a large volume of liquid to pass before they will need cleaning; great economy and high efficiency resulting.

For instance; in refining sugar the carbonated syrups pass into the centrifugal; the solids of these syrups consist of the lime and the impurities made insoluble by the lime and carbonic acid and converted into suspended matter. This suspended matter held in the liquor is about 1/200 of the mass and of this amount 98% is heavier than the liquid compound and about 2% is lighter. The 98% is impacted on the shell of the basket and the 2% is caught in the filter bags: the net result being a perfect and very rapid separation and saving 90% of the bags at present used for this service and 90% of the labor required to wash and keep the bags in filtering condition. This is the most expensive feature of sugar refining and the combination of my centrifugal filter to separate the heavier solids in suspension and the co-acting bags for the lighter save 90% of this expense; a revolutionary economy.

An eighth feature of my invention is the provision of a series of vanes on the liquid conductor leading from the basket filtering zone to the curb and carried by the basket forming in effect and in fact a centrifugal pump, whereby a very strong current is induced forcing the liquid into the curb and preventing falling back into the basket.

A ninth feature of my invention is an adjustable basket top whereby the walls for solids impacting can be varied and predetermined to suit different materials, or different conditions of the same material.

Other features of novelty will be described hereinafter. In the drawings like parts are referred to by character of a corresponding kind in the different views.

Fig. 2 is a horizontal section on line 1—2 of Fig. 1, but with the machine basket loaded with a mass of separated solids, and showing the supplemental liquid collector in action and swung away from the basket discharge port for solids.

Fig. 3 is a section on line 3—4 of Fig. 1, showing the sweep in action and the provisions for permitting a basket shaft oscillation.

Fig. 4 is a section on line a—a of Fig. 3.

Fig. 5 is a plan of the pivot end of one of the lifting arms for the basket valve.

Fig. 6 is a plan view with motor removed and part of the bed plate cut away showing the main operating mechanism of the machine.

Fig. 7 is a section of the resilient link between the segmental rack which oscillates the basket sweep and the actuating cam which operates it.

Fig. 8 is a side view of the lever which oscillates the under basket supplemental liquid collector.

Fig. 9 is a side view of the indicator and trip carrier.

Fig. 10 is a plan of the same.

Fig. 11 is a section on line 5c of Fig. 10 showing the worm dog lockingly disengaged from its actuating worm.

Fig. 12 shows the locking finger for the worm dog. This finger locks the dog when engaged with and when disengaged from the worm.

Fig. 13 is a plan of the bottom of the basket with the sweep in position cleaning the wall of the basket of separated solids.

Fig. 14 is a section on line 5—6 of Fig. 13, showing how the solids are deflected as they strike the arms of the basket bottom.

Fig. 15 is a side elevation of the cleaner for the walls of the basket.

Fig. 16 is a plan of the same.

Fig. 17 is a vertical section of the basket with the cleaner and sweep in action and the bottom port opened to receive the solids.

Fig. 18 is a vertical section of the basket and a wall of separated solids at the time the basket has been reduced to slow speed and at which time the liquid wall is passing out the basket bottom to its collector under the basket.

Fig. 19 is a side elevation of the clutch moving bar and the prime shaft. The worm and connections are broken away in this view.

Fig. 20 is a vertical section through the basket and the bag filter chamber, showing the passage of the liquid from the basket interior over the top into the curb chamber and into a conductor leading to a series of bag filters, said liquid carrying solids in suspension lighter than the liquid.

Fig. 21 is a plan of the bell contact to signal the conclusion of a machine cycle.

Fig. 22 is a section on line c—c of Fig. 19.

Fig. 23 is a side view of the segmental rack which operates the cleaner shaft rotatively.

Figure 1:
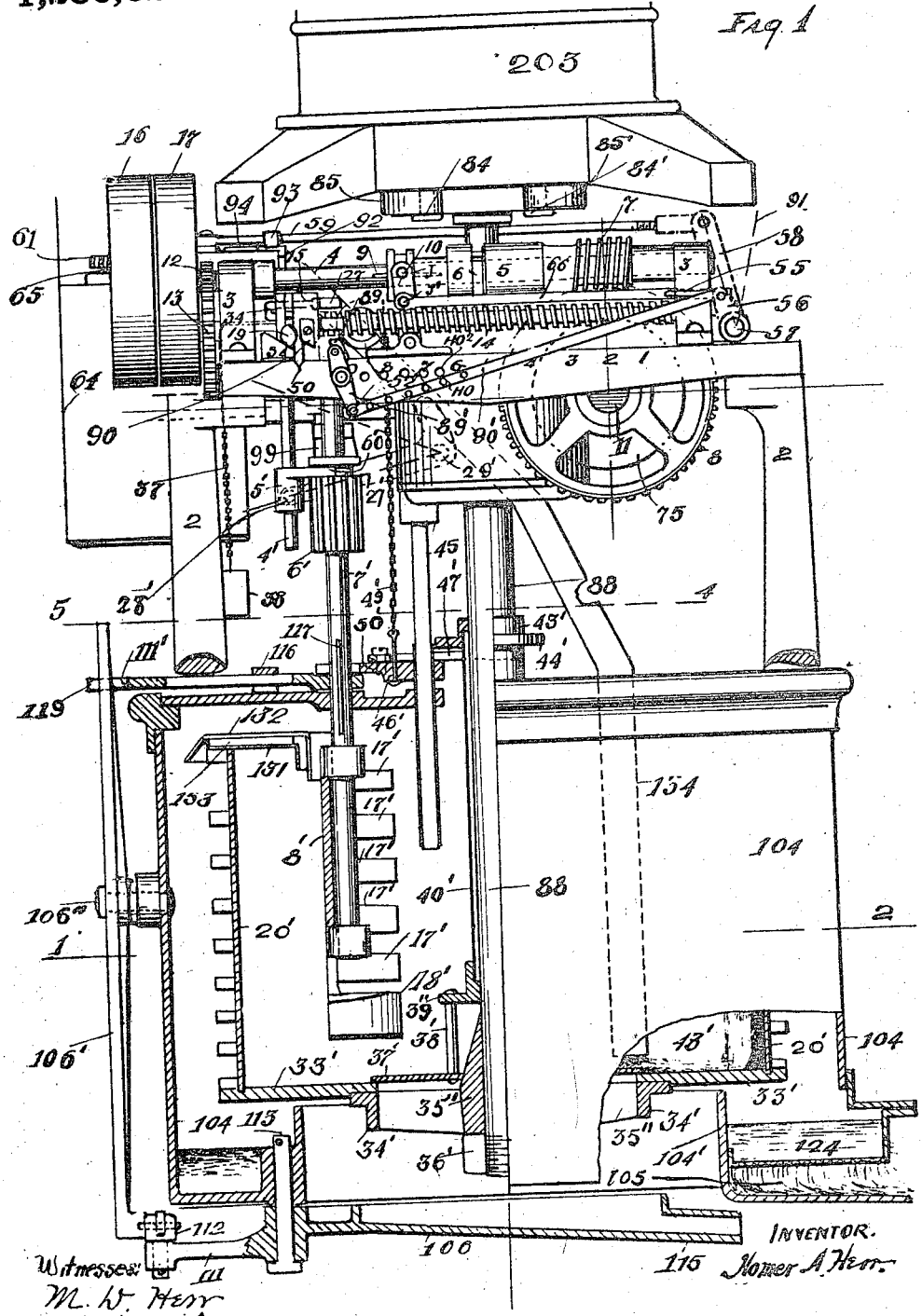
Figure 1 is a front view of the machine showing one half the basket in elevation and one half in vertical section.

Fig. 24 is a section through the basket and showing the valve for the basket bottom part raised and the means for raising it; also the cam and resilient link for oscillating the cleaner to sweep the basket shell and bottom. Fig. 25 is a section on line O—O of Fig. 24. Fig. 26, is a plan of the chain sleeve for raising the valve in the basket and showing its connection with the cleaner shaft which operates it.

Fig. 27 is a plan of the cam which oscillates the cleaner shaft and Fig. 28 is a plan of the cam which effects the raising and lowering of the same shaft.

Fig. 29 is a plan of the top of the basket and a section of the curb ring. The basket plan shows the adjusting plates permitting variable wall thickness of separated solids.

Fig. 30 is an end view of a cam for automatically snapping the trip leader dog into position at the conclusion of one machine cycle and the commencement of the next.

Fig. 31 is a section through feed valve case and showing connections for actuating the feed valve, enlarged.

Fig. 32 is a side view of the mechanism for tripping the clutch operating link.

Fig. 33 is a plan of the same and a section on one of the arms 10 of the clutch actuator on line J".

Fig. 34 is an enlarged detail of the adjusting means for regulating high speed periods. Fig. 35 is a plan. These two views show the cam trip, link and lever; all as being adjustable to corresponding degrees.

Fig. 36 is a view of the trip cam 54.

1 is the bed plate of the machine supported on standards 2, 2, there being four of these standards, one on each corner of the bed plate, as shown in Fig. 6, with one cut away. 3, 3 are two housings for the prime shaft 4. This prime shaft carries clutch jaws 5 and 6. The jaw 6 is splined to shaft 4 being held thereto by key 9 and therefore rotates with said prime shaft. The jaw 5 rotates only when it is locked to jaw 6. The specific construction of these clutches forms no part of my invention and I therefore do not go into a description thereof further than to note that when the arm 10 of the straddle is moved toward 5 the jaws 5 and 6 are engaged, and when it is moved from 5 the said clutch jaws are disengaged.

7 is a worm rigid with clutch jaw 5 and 8 is a worm wheel operated thereby. 11 is a shaft carrying worm wheel 8 and, therefore, rotates with it. 12 is a pinion carried by prime shaft 4 and 13 is a spur gear carried by worm 14. This worm, 14 is, therefore, actuated by the prime shaft 4, through the pinion 12, which is pinned to said prime shaft, and spur 13 which is fixed to said worm.

16 is a fast and 17 a loose pulley on the prime shaft 4. 15 is a multiple contact carrier guided on rod 15" and operated by the worm 14. The function of this contact carrier 15 is to control the motor speed, to signal the conclusion of a cycle of the machine, and to carry the indicator finger 50 to predetermined separating periods, etc. It consists of a main part 15 having a vertical slot 18, best shown in Figs. 10 and 11, a handle 19 forming part of a dog 20 and fitting in said slot 18, said dog having an arc shaped portion 21 which engages in the grooves of the worm 14 and co-incides with the curve formed by the bottom of said grooves; thus becoming locked thereto. A pivot pin 23 holds the lever dog 19—20 to the main part 15 and in said slot 18. A spring 24 connects the lever 19 with a lug 25, fixed to the main body of the trip carrier 15, and when the dog lever 19—20 is not held in the position shown in Fig. 9 the said spring 24 will snap it up against the stop pin 26 and the part 15 will be free to slide over the worm 14.

28 is a U shaped lock for the dog 19—20. It is in fact a double lock, in that it locks the said dog in or to the worm 14 and it also locks it in disengagement from said worm. 29 is a spring incoiling said lock and 27 is a head of enlarged diameter giving said spring a seat for compressive resistance. 30 is a hole in the arm or leg 31 of the member 15. This hole is of the proper size to have the head 27 of the lock 28 slide therein.

32, Fig. 9, is a hole in the member 15 to accommodate the smaller leg of the U lock 28 and 33 is a hole in the same member to accommodate the longer leg 34 of the U lock. (It will be understood that the head 27 is threaded upon the leg 34, not integral therewith.) Now as the worm 14 carries the member 15 in the direction of the arrow 35, Fig. 10, when it nears the right standard 3 the end 27 of the U lock will contact with the standard 3 and on further movement will force the end 27 and the legs 28 and 34 back against the spring 29 until the U lock has moved from line 4c to line 3c in Fig. 10. This movement will move the end 36 of the U lock back from position indicated by line 2C to 1C, whereupon the spring 24 will snap the lever dog 19—20 to the position shown in Fig. 11, or against the stop pin 26 therefor. The arc end 21 is now disengaged from the worm and the chain 37 through the force of the weight 38. Figs. 6 and 1 will pull the member 15 back to the position shown in Fig. 6 or its initial position for predetermining purging periods.

At this time I signal the predetermined conclusion of a cycle by a bell and close the circuit for the bell ringing by the member 15. This is best shown in Fig. 21 where 39 is a lug carried by member 15. This lug or part contacts with the circuit closing rod 47 carrying contact 44, and moves it to the dotted line position 49, after which the electrical current will flow through conductors, 42 and 41 from battery 43 to bell 40 and the bell will ring notifying attendant a cycle has been completed. The lug 39 also acts as a stop to limit the movement of the member 15 toward the left as shown in Fig. 1. 45 and 46 in Fig. 21 are bearings for the rod 47.

In Fig. 1 only is shown a series of numerals. These numerals indicate time periods of one minute each. A finger 50 indicates the setting point for the member 15.

In case it is desirable to have a very short cycle the stop rod or lug 39 would be made longer than shown. This would be determined by the material entirely. As in some instances a cycle would comprise 2 to 3 minutes and in others one hour or more. In the latter case reducing gears would be interposed between the prime shaft 4 and the worm 14 to suit the special requirements.

The moment the U lock has removed the leg 28 from the hole 32 the spring 24 will move the lever 19—20 from radial line 51, its normal locked position, to radial line 52, its normal unlocked position. The latter position contemplates the hole 22 of the dog 20 coinciding with the hole in the member 15 which carries the leg 28 of the U lock. As this leg 28 passes into the co-inciding hole 32 (Fig. 9) of the member 15, when the lock 20 is in engagement with the worm 14, the leg 28 passes over the top thereof and is thus held by the spring 29 until the said leg 28 is forced back by the head 27 of the U lock engaging a fixed part of the standard 3. This movement of the member 15, while the head 27 of the U lock is arrested in moving therewith, is indicated at Fig. 10 from line 4C to 3C; and as the aforenamed chain 37 through weight 38 will thereafter immediately pull the member 15 away from its engagement with the right housing 3, through end 27 of the U lock, being released from contact with said housing, the spring 29 will snap leg 28 of the U lock in hole 22 of the dog 20 and hold it until released.

In order, however, that the locking of the dog 20 will be yielding, in the interests of acting automatically, I bevel the end 53 of the leg 28 of the U lock, and as the member 15 is returned to its initial position the handle 19 will engage a cam 54 and the force of the weight 38 is sufficient to overcome the tension of the spring 24 and the friction of the bevel end 53 induced by the spring 29 of the U lock; this will put the lever 19—20 from radial line 52 back to radial line 51 and the arc 21 of the dog 20 will again be locked to the worm 14, as the spring 29 will snap the leg 28 of the U lock over the top of the dog 20 as shown in Fig. 9.

Should I at any time desire to dispense with the automatic action of the locking dog 19, I merely remove the cam 54, after which, at the conclusion of a cycle and the sounding of the bell alarm, an attendant can put the lever dog in engagement with the worm 14, by manual service.

As hereinbefore set out, it is the law of my machine that the purging is done at a predetermined high speed from 900 to 1600 R. P. M. and the passing of the solids from the basket at a slow speed from 75 to 100 R. P. M. and these speeds are automatically controlled. There are certain materials and certain conditions where I may elect to control the speed of the basket by manual manipulation. Certain features described and claimed by me are not dependent upon the provision of automatic speed controlling means. As to such features I place no restriction or limitation in the manner of speed control. While the member 15 is traveling from any of the possible positions for predetermining purging periods to contact with the push link 55, Fig. 6, the basket is at high speed, or, to make it somewhat more clear: in Fig. 6, while the member 15 is moving from line 62 to line 63, but the moment the point 63 is reached and open link 55 is moved by the continued movement of member 15, the arm 56 is oscillated, as well as shaft 57 and arm 58 carrying link 59 which operates motor controller 64, through segmental rack 60 and pinion 61, the latter operating contacts on shaft 65 of the controller. Resistances are thus put in the field and armature circuits of the motor (resistances being built in the controller) and the speed is reduced to slow cleaning speed. Of course by this same mechanism, if for any reason I desired it I could stop the motor entirely by swinging the controller. Following the slowing down of the motor the clutch jaws 6 and 5 are engaged so the worm 7 will actuate the worm wheel 8 and connections on shaft 11.

This I accomplish as follows:

66 is a link connected with the clutch operating straddle 10, 10 at one end and carrying a lug 67 near the other. As the member 15 moves forward, as already set out, the lug 68 thereon will engage the lug 67 of the link 66, shown only in Figs. 6, 9 and 10; and as the link 66 is pivoted to the adjacent arm 10 of the clutch moving clevis or straddle the said clevis is oscillated from line 69 to 70; Fig. 19, and this oscillation moves the jaw 6 from line 71 to line 72, closing the clutch and operating rotatively the worm 7, worm wheel 8 and shaft 11. Immediately the clutch jaws 6 and 5 become engaged the shaft 11 will rotate. This shaft 11 carries a cam 73, being a double lateral cam, and adapted to oscillate arm 74 horizontally in two directions. 75' is a friction roller riding on the outer face of cam 73, and 76 is a roller riding on the inner face of the same cam. 77 is a shaft which carries the arm 74 at its lower end and the lever having the contacts 82 and 83 at its upper end and these two contacts impinge respectively on brake levers 78 and 79, shown only in Fig. 6.

As will be seen: when cam 73 moves lever 74 toward roller 76 the lever 82—83 on shaft 77 will spread the levers 78 and 79 to dotted lines 80 and 81 and the brake shoes 86' and 86, through their supports 85' and 85, will impinge the brake wheel 87 carried by the basket shaft 88 and quickly arrest the high speed of the basket. The pivot pins 84 and 84' are carried by the bottom of the motor supporting frames, as shown in Fig. 1. The lateral roller contacts of the cam 73 are so adjusted and arranged that the brake is in action until the speed of the motor is reduced to about 75 to 100 or less R. P. M. Then the brake is released by the lever 74 being oscillated toward roller 75', which oscillation, through shaft 77, swings the lever thereon having the contacts 82 and 83 back to normal as shown in Fig. 6; normal implying that the brake shoes 86' and 86 are free from contact with brake wheel 87.

If I should wish to make the action of the machine non-automatic, at this point, I would adjust the link 59 connecting controller 64 with arm 58 so the contacts thereof would oscillate to line 202 the neutral position instead of line 201, the slow speed position, assuming that the machine is set for automatic action and the cam 54 is placed for this purpose: we will make the adjustment of the lug 39 on the member 15 when the movement of the member 15 is arrested by the said lug so the dog 89 on the lever 89' is far enough from the trip contact 90 to permit of the worm wheel 8 making a full rotation and stopping (the manner of which I will presently describe). This travel of the member 15 is a slack in the cycle and is merely to occupy the time while said worm wheel 8 completes its rotating. After this said rotation, the adjusting being correct, the lug 90 on the member 15 engages the dog 89 of the lever 89' and through the link 90' oscillates lever 58 from dotted line 91 to dotted line 58', see Fig. 19. This oscillation of the said lever 58 will, through the link 59, swing the segment 60 of the controller 64 so that the speed of the motor will be accelerated to high. As the speed of the motor is accelerated when the machine is arranged for automatic action it is necessary to open the valve admitting unseparated material into the basket. I do this as follows: the link 59 which controls the motor controller (see Fig. 6 and Fig. 32 on sheet 6) carries a link holder 93 which is connected by a link 94 with an angular extension 95 of the gate valve 96. When the terminal of link 59 is at line 98 the valve 96 is open and the unseparated material is free to pass through pipe 92 into the basket. This occurs at high speed and the movement is accomplished by lug 90 engaging dog 89, operating lever 89', link 90', rod 57 and the direct link element 59. When the terminal of link 59 is at dotted line 97 the valve 96 is over the feed pipe 92 and the flow of unseparated material is arrested. This occurs before and during slow speed and while the basket is being cleaned, as will be described hereinafter, and it is accomplished by the contact of the member 15 with the push link 55, Fig. 6, oscillating the lever 58 from radial line 58' to line 91, or in the reverse direction to the motion used to open the said feed valve 96. The contacting portion of the member 15 with the push link 55 can be either integral with the member 15 or held thereto in an adjustable manner, but this contact part must be free to pass over or by the standard 3 and not contact therewith. The cam 54 is adjustable on the bed plate 1 of the machine when it is desirous of making the machine with a variable and adjustable purging period. The lever 89' is adjustable with and to suit any change of the adjustment of the said cam 54.

In Figs. 6 and 21 I show a rod lug 39, carried by the member 15 and designed to close the bell circuit at the conclusion of a machine cycle and as a signal to the attendant that the said cycle is completed. This lug 39 must be lengthened or shortened to suit any change of adjustment of the cam 54 on the bed plate 1, the link 90' requiring similar adjustment. In practical construction it is good practice to drill a pivot hole in the side of the bed plate at the point of each minute indicating numeral in the numeral carrying frame, as shown in Fig. 1 for the pivot pin of the lever 89'. The rod 90' would carry corresponding holes or holes of corresponding pitch. Thus by lengthening the rod 39 which, aside from closing the bell circuit, is a stop rod for the member 15, and correspondingly shortening rod link 90' and changing the position of the pivot pins for lever 89' we can adjust the machine for any period of high speed we may desire.

Should I desire to make my feed a manually controlled one I should dispense with the connections between rod 59 and the valve 96 and an extended rod accessible to the attendant would be attached to the said valve 96.

In material where the percentage of solids held in solution is very small, such as sugar liquors in refining sugar a hand manipulated valve would be efficient, inasmuch as it requires over one or two hours to build a solid wall on the basket shell and about 4,000 to 6,000 gallons of material must pass through the machine to get enough solids to do this, but in material such as bauxite clay, magnesia or similar high suspended saturations, a wall of solids will be built on the shell in a few minutes and, in this case, it is in the interest of efficiency to connect the valve 96 to link 59 as set out and have the cam 54 in place to relock in continuous successions, after each cycle of the machine, the dog-lever 19—20 with the continuously rotating worm 14 as set out.

I have now described how I control the motor, the time, how I control the brake, operate the signal bell, the feed and how I lock and unlock dog 20 and return it to its

The cleaning of the basket.

99 is a lever pivoted to the bed plate of the machine by pin 102. At its near end it carries a segmental rack 100. This rack meshes with the pinion 6' on shaft 7', which is the shaft which carries and operates the cleaner frame 8'. 2' is a resilient link having a terminal guide 3' and forming the operative connection between the cam 101 on the shaft 11 and the segmental arm 99, a pin 9', Fig. 6, holding said link connected to said arm.

The cam 101 is shown in Fig. 28 in plan. A is that section of the cam that holds the cleaner blades and sweeps against the wall of the basket shell and at slow speed. B is that part of the cam that holds the cleaner out of the zone of centrifugal activity or while the brake is being applied and speed is being reduced, as well as during the period of high speed, f' is that part of the cam which oscillates the cleaner rod 7' to wall contact l and f that part of the cam which removes the cleaner rod 7' from wall contact. The resilient link 2' comprises a number of subelements and is shown in Fig. 7 as consisting of a central stem 2', carrying an adjusting nut 14' a cored, spring seating chamber 11', having an integral laterally projecting arm 10', a take up cap 12', a spring resisting collar 15' and a spring 13'. The terminal of 2' has a shaft straddling slot 15', Fig. 25, and carries a friction roller 14'' running in the cam groove, as shown in Fig. 28 B, f, f', and A. The purpose of making this link resilient is to permit of basket oscillation without strain on the cleaner shaft 7' and it acts as follows: as force is exerted by the cam 101 in the direction of the arrow 16' (Fig. 7) on the link 2' the spring chamber 11' and connections will move in the direction of the said arrow and the pin 9' will oscillate the segmental rack and arm 100—99. This will oscillate the cleaner shaft 7' carrying the cleaner blades shown in Fig. 15 at 17', 17', 17', 17' and also the bottom sweep 18', indicated by dotted lines in Fig. 13 in its position of normality, and also in full lines in its position of contact with the basket shell 20' during the performing of its cleaning and sweeping function. The sectional view, Fig. 13 simplifies the understading of this sweeping function, where the material is shown as being scraped from the shell wall and carried to the center discharge post in the bottom of the basket.

We will now suppose that, by reason of lack of uniformity of distribution in mass or other causes, the shell wall will be thrown out of its normal rotary path while the cleaner blades 17', 17', are in contact therewith. On such eccentric motion the pressure on the scrapers 17', 17' will oscillate the shaft 7', with which they are rigid, and the pinion 6' will oscillate the segmental arm 99 camward, the pin 9' transmitting the angular movement of this oscillation into a rectilinear movement of the spring case 11' and, as the bearing 11ª, (Fig. 7 only) of this spring case permits of the rod 3' remaining stationary while the case 11' is thus being moved, the cleaners 17', 17', can oscillate to any practical degree without any strains of serious nature to their supporting rod 7' or to their actuating cam 101.

Thus is permitted the oscillation of the cleaner blades 17', 17' and sweep 18' to and from contact with the basket shell 20', at slow cleaning speed after the said blades are put down on the basket bottom which latter function I will now describe: 21' is a cam on shaft 11, shown also in Fig. 29. 22' is a link connecting this cam with the arm 24' of a lever comprising arm 24' arm 27' and stem 23' (see Fig. 6). The arm 27' carries a lateral projection 28'. The stem 23' is pinioned to lugs projecting from the bottom of the standard bed plate 1 which are shown in Figs. 6 and 25, the former being a section through the pivot pin 29'. The dotted lines 30', 31', Fig. 25 indicate the extreme movements of the oscillation of the bell crank arm 27'. In Fig. 29 the part E of cam 21' holds the rod 7' up, the arcs C, C hold it down in engagement with the bottom of the basket and the point D gives a quick vertical reciprocation to the cleaners 17', 17', before they are raised up at the end of a machine cycle. The reason for this will be made obvious by consulting Fig. 17, where it will be seen that 32' represents a section of separated solids that have not been removed from the basket shell wall by the horizontal swing of the cleaners 17'. So after the said cleaners have been oscillated by their cam 21' to have cleaned the walls in horizontal inner circumferential sections, as shown in Fig. 17, the rotation of the cam 21' will carry the roller 14'' to the apex D of said cam which will raise the cleaners 17', 17' from line 10X to line 9X, Fig. 17. This will free the walls of all impacted material and then, as the cam 21' continues its further rotation, the sweep 18' is lowered with the rod 7' and the blades 17' and the material is carried from the basket bottom to the port as shown in Fig. 17 and out of the basket of the machine. The further rotation of cam 21' will raise the sweep 18' off the basket bottom and out of the zone of centrifugal activity.

The design of this sweep 18' carrying the material off the bottom after having been scraped from the walls 20' of the shell is to use the force acquired by the rotation of the material inherent in the momentum of the mass to overcome the friction against the sweep and pass it out the basket bottom by this force of momentum centripetally. The bottom 33' of my basket has a concentric hole 33'' forming a discharge port for the separated solids 40''. 37' is a valve, cover, or seal for this port. 38', 38' are a series of rods holding said valve to its lifting ring 39' said ring having an integral collar 39'' which carries a tube 40', said tube incasing the basket shaft 88. The bottom 33' is supported from the shaft 88 by an angular ring 34', a central stem 35' a nut 36' and a series of arms 35'', 35''', etc. These arms are angularly inclined in section as shown in Fig. 14 so that the rotating bottom will reflect the material downward as shown by the arrows 42' in Fig. 14 under the well known law that the angle of incidence is equal to the angle of reflection. This permits me to operate the machine quite rapidly at slow speed, with rapid cleaning possibilities. The sleeve 40' is carried by or fixed to a collar 43' having an extended ring flange 44'. 47' and 47'' are two pivoted levers on which the flange 44' rests when the valve 37' is raised off the port 33'' and the cleaner sweep 18' is down sweeping out the basket. These two levers are supported on a carrier 46' which is guided on a rod 45'. The pivot pin 50' holds the said two levers 47' and 47'' on said frame 46'. This frame 46' has two straddle arms 46'' and 46''' serving as guides therefor on rod 7'. 51' is a rest or contact for said two levers, being an integral part of the said carrier 46'. 49' is a chain fixed to said rest, as shown in Figs. 25 and 3. 49'' is also a chain fixed to shaft 7'. 51'' is a small chain pull and 52' is a larger chain pull. They are integral and supported on a common pin 53' which is threaded into a support 54' of the bed plate 1 of the machine. It is evident that inasmuch as the carrier 46' is connected with the chain 49' at one end and the cleaner rod 7' is connected with the chain 49'' and these opposite ends of these respective chains are fixed to the same integral element, 51'—52', that the carrier 46' will move up when the rod 7' moves down, and, as the said carrier has pivoted thereto at 50' the two levers 47' and 47'', and these two levers rest on the under side of the flange 44' of the collar 43', through the tube 40', the bottom valve or seal 37' will be raised as the rod 7' goes down and lowered as the said rod is raised, thus sealing the port 33'' when the cleaner shaft 7' and blades 17', 17' are out of the zone of centrifugal activity and the basket is at high speed and opening the port 33'' when the cleaner blades are descending for the purpose of cleaning out the basket and passing the separated solids out of the basket through said opened port 33'', as shown in Fig. 17.

The purpose of the pivoting of the fingers 47', 47'' is to permit the oscillation of the shaft 88 which carries the basket without straining any part of the mechanism and to retain said fingers always in position for lifting the valve 37' regardless of oscillation of the basket. Dotted line 56' indicates a position of shaft 88 as out of normal, but such position as a suspended centrifugal basket shaft is continually likely to be moved to in the practical operation of the machine. It will be seen that the dotted line 55' indicates the position of lever 47', as it follows the shaft 88 in this movement and the spring 57 pulls arm 47'' corresponding to the position indicated by line 58''; so no matter how the shaft, by virtue of eccentricity of rotation, may rotate out of a normal center the arms 47' and 47'' will follow it with no strain on any part of the mechanism and be always ready to lift the sleeve 40' and connections. While the shaft 7' is moving up and down, as and for the purpose set out, the long pinion remains in continual mesh with the segment 100. That is why it is long. The dotted lines 7X and 8X represent the extremes of eccentric shaft movement as shown in Fig. 3.

The straddle 5' of rod 4' can either slide on the guide shaft 4' or the shaft can be guided in bearings, as may be desired; the groove 59' holding the forks 60' therein for this purpose. The arm 28', is pivotally held to the lug 61' of the straddle, having the groove engaging arms or forks 60', 60'. Needless to say that the dotted position indicated at 62' of the valve raising elements and the dotted position of the valve indicated by 63' correspond to extreme lower positions of these relations.

*Discharging residuum liquid.*

This machine as explained hereinbefore is designed to separate two classes of solids from liquids held in suspension when the specific gravity of the two classes differ.

Now after a wall of separated solids is impacted on the basket shell, as shown in Figs. 20 and 18, there remains a small wall of liquid, which, with the washings off the solid wall, as the machine is reduced to slow speed, will not be separated from its associated solids; therefore it is necessary to get this unseparated mass out of the way before the solids are discharged from the machine, and not permit it to come in contact with separated liquid or separated solids. I do this as follows: In Fig. 18, 42'' shows a wall of separated solids impacted on the shell of the basket. 43' shows the wall of liquid remaining in the basket on the wall of solids at the time the speed is being reduced, and as the machine is slowing down from high to low it will run out the port 33'' into a swinging chamber or collector, 106. This collector is pivoted to the underside of the curb as shown at 113. It has an outlet 115 through which the mass is passed to trough 108 and therethrough to outlet 109 to the point of collection or well (not shown). 110 is a link having a swivel end 112 and connecting lever 106', pivoted at 106'' on curb, to arm 111 of the collector 106. Normally the collector is in the position shown in Fig. 2 directly under the port in the basket bottom, shown by radial line 5X and when the solids are being discharged it is in the position in Fig. 2 indicated by radial line 6X. The lever 106' is oscillated from line 10X to line 11X, Fig. 8 as its normal movement. This corresponds to line 1X to 2X in Fig. 3 and 1X to 2X in Fig. 2. This is also the same angular movement, as is shown, from radial line 3X to 4X of Fig. 3. The shaft 7', it will be remembered, is the cleaner shaft and carries the cleaner blades; these blades move oscillatably from 4X to 3X. These radial lines correspond in Fig. 3 and Fig. 6. The part 111' is journaled by the shaft 7', being splined thereon so the boss on the lever 111' can slide on the spline 117. To do this I provide a horizontal guide and retainer 116, Fig. 1, to prevent the lever 111' from moving up with the rod 7', but to permit horizontal oscillation.

As the shaft 7' passes down, as already set out, the key 117 will pass through the slot in 111' until the said cleaner carrying shaft is down to the required limit. It is thus oscillated, after a temporary rest, given it by the construction of the cam 101. During the temporary rest the liquid forming the liquid residuum wall 43' is passed through the port 33'' to the underneath collector 106, as shown in Fig. 18. The slow speed must be slow enough to permit this to be done very quickly and so centrifugal force will not hold the liquid wall partially intact. Following this temporary rest, after the shaft 7' has passed down to its lower limit, the said shaft is oscillated in the direction of the arrow 118, Fig. 3, until its angular movement is completed which is from radial line 4X to radial line 3X. The bottom sweep 18' is now in contact with the inner wall of the basket shell and will clean out the impacted solids, as shown in Fig. 13. Meanwhile the arm 111' will oscillate from radial line 2X to radial line 1X, Fig. 3. The lever 111' has a forked end, shown in Figs. 3 and 8 only, and indicated by 119 and 120. The lever 106 is engaged by the forks aforesaid of lever 111' and in this manner, through the link 110, oscillates the collector 106, as the said link 110 is pivoted to lever 106' at one end and at the other to arm 111 of the collector 106. After the solids are cleaned from the basket, as already described, and as best shown in Fig. 17, the cam 101 will swing the lever arm 111' from radial line 1X to radial line 2X (Fig. 3) and this will swing the lever 106' from 10X to 11X Fig. 8 and the collector 106 from radial line 6X to 5X, or back to its normal position under the port 33'' of the basket 20'.

The trough 108 receives all the unseparated liquids and discharges them through 109 to a tank or reservoir from which they can be pumped back to the original supply tank. In Fig. 2 I show a horizontal section through a basket and just at that point of the cycle of the machine when the speed of the motor is being reduced to slow. The arrows 114 show the passing of the liquid wall 43' out the bottom port into the collector 106 and out of the collector through trough 115 into the trough 108 and outlet 109. The section of Fig. 2 showing the arrows 122 indicates the passing of the liquid as separated from its associated solids to the curb surrounding the basket 20' from which curb it is discharged at 105 with all solids held in suspension separated therefrom, providing that they are of greater specific gravity than the liquid.

Where there are a portion of the solids that are lighter than the liquid or of equal specific gravity they will of course not impact on the basket shell or form part of the mass 42''.

These lighter solids will pass from the basket with the liquid and form part of the mass shown in Fig. 20 and 42'''. It will be noted that I differentiate 43' from 42''' as the former is practically an unseparated mass and the latter has all the solids removed of greater specific gravity than the liquid.

It is particularly true of sugar syrups that after defecation the insoluble solids carry with them a small part consisting of light fiber and various substances that are lighter than the liquors. These will pass out with syrup 42'''. To separate these it is necessary to pass the mass through filter fabric and any convenient form of filter fabric will answer. I show, however, a series of bags and a common trough for the series with a conductor leading from my basket to the bags. This conductor could be of any form. It might be a storage tank or a series of tanks from which the juices are pumped, or discharged by gravity, after passing therein from my machine chamber. 123 is a chamber holding a series of bags made of filter fabric of suitable mesh for the syrup under treatment, and 124 is a trough forming part of or connected with the curb chamber of the centrifugal basket 104 and 104', Fig. 20, only. The syrup 42''' carries with it a small volume of solids approximately 1/10,000 of the mass to 1/5,000, but this must be separated. I, therefore, discharge liquor 42''' from the curb chamber 104—104' into trough 124 from which it passes to bags 126, 126, 126, 126, and thence out past 127 through cock 128 where at 129 it is pure filtered syrup having all solids removed that are held in suspension; the heavy solids being in the cylinder basket on the shell wall 20' and the lighter solids being in the bags 126, 126, 126, 126. From the basket these solids are discharged in the manner I have already described, and from the bags they are washed manually in the usual way.

Where the specific gravity of the solids is uniformly greater than the liquid associated of course the bags are not necessary nor is any equivalent for them required.

By this filtering first in my machine and then in the bags the cost of refining sugar is greatly reduced as 90 to 95% of the bags or filter fabric now used can be dispensed with as well as 90% of the labor required to attend to these bags. Thus I eliminate the most costly portion of the labor in sugar refining.

It is important for a machine of this class that I be able to build walls on my basket shell of varied thickness in order to meet practical requirements for the following technical reasons: Suppose I am separating a solid held in suspension in a liquid that in ordinary gravity relation of the two will require ten hours to settle in a vessel.

Ten hours comprises 36,000 seconds. Now, suppose I give a speed to my basket shell so that I intensify gravity, or accelerate it so that one pound as it enters the basket will weigh or exert a force of 1000 pounds, which would be accomplished by a basket shell 36" in diameter rotating at 1400 R. P. M. per minute, a 24" diam. of basket rotating at 1,800 R. P. M. or a 48" diam. of basket rotating 1215 R. P. M. We will now assume that the flow of unseparated material, as shown at feed pipe 134, Fig. 20, is of such volume that it takes 108 seconds to discharge sufficient through this pipe into the basket to build a wall, as shown in Figs. 20 and 18, from dotted lines 133 to 135; it being understood that no liquid will pass from the basket over the top as shown at 136 Fig. 20, until the wall of liquid has reached line 135; therefore all the unseparated material between the lines 133 and 135, when the basket is loaded, will be under the influence of an intensified gravity of 1000 times over normal and two thirds of it will have been under this influence for 1/3 of 108 seconds or 36 seconds. Now 1/1000 of 36000, the seconds of time required for normal gravity settling, is 36. So I get the same results, theoretically in 36 seconds that is accomplished by ordinary gravity separating in 10 hours.

While in practice I do it much more rapidly, with my machine. instantly in fact, yet this is an absolutely safe practical manner to predetermine my feed to basket for commercial purposes. We will now assume that in certain material it is desirable to build a smaller wall or to hold the material in the basket a shorter time by reason of greater difference in specific gravity whereby normal settling will be accomplished in less time. To meet this situation I provide ports in the top of my basket ring 131, as shown at 137, 137' and 137'', and a cap or cover for each port, two only of which are shown in Fig. 30: 138' for port 137 and 138 for port 137'. They are held by locking screws to plate or ring 131, 139 and 140 for 137 and 141 and 142 for 137'. The section 143 shows the wall at 146 where no port is opened. The section 144 shows the wall 147 where the port 137' is entirely exposed and the section 145 shows the discharge and solid wall 148 with partially exposed port, corresponding to the valve 138' being set back to line 149. Locking holes 150, 151, 152, etc., can be provided for any adjustment of the valves or plates 138' and 138.

In the illustration I have given as to gravity acceleration it will be noted 108 seconds are required to fill the chamber to line 135, the discharging point, and that this is three times the time of normal centrifugal action on the particular material treated. Therefore, I should have a 2/3 wall of solids before closing of the feed and I adjust my machine to operate automatically for this wall thickness, so that all the material not discharged with the liquid will have been under 36 seconds of accelerated gravity. This will insure perfect separation. To facilitate clean liquid discharge, as separated, through the horizontal trap forming conductor, formed by rings 131 and 132, I place a series of bars, arranged as shown in Figs. 30, 153, 153 and thus form a centrifugal pump of great suctional power which draws in and forces out the separated liquid as shown in Figs. 20–136.

In describing the operations for motor speed control and the actuating of link 59 I left the clutch jaws 6 and 5 engaged which engagement will continue to rotate the worm wheel 8. But it is the law of the machine that this wheel 8 shall only make one revolution, in each cycle of the machine and then must have its rotation arrested. This is accomplished by unlocking clutch jaws 6 and 5 by moving jaw 6 from line 72 to 71, Fig. 19 which I do as follows: 155 is a link pivoted to lever 156 at $h$, the said lever being pivoted to the lug 158 of the standard 3. 159 is a link pivoted to the lever 156 at $i$ at one end and at the other to the clutch moving straddle 10 at J. 161 is a pin carried on wheel 8 shown in Fig. 19 and 160 is an offset or hook on link 155. The wheel 8 when its clutch jaws 6 and 5 are engaged, as set out, rotates in the direction of the arrow 165 and the pin 161 will engage the link 155, as this link occupies the position shown by dotted line 167 Fig. 19 while the wheel 8 is rotating; after said pin engages the said hook 160 on the link 155 the link will be moved in the direction of the rotation of the pin until the said link will oscillate the lever 156 from M to M', equivalent to the movement of the pin from e" to e'. The link 159 will pull the clutch jaw 6 from line 72 to line 71 unlocking it from jaw 5, stopping the worm wheel 8 and worm 7, its driver. The link 155 is on the inner side of the worm wheel 8, as shown in Figs. 6, 19, 33 and 34, and the link 66 is on the outer. Of course when the clutch jaws 5 and 6 are disengaged the wheel 8 will stop with the pin $e''$ at position $e'$, Fig. 19 but the hook end 160 of the lever 155 will remain in engagement with the pin 161 of the wheel 8 and it will be impossible for the wheel 8 to rotate while this lever hook is so engaged. The manner in which I disengage this lever from the said pin 161 is as follows: After the carrier 15 has traveled on the worm 14 the distance predetermined by its place adjustment, as already set out, it will engage the end of loose link 55, Figs. 6, and 4 only. This loose link 55 is pivoted to short arm 56 of rod 57, which rod also carries, it will be recalled, lever 58 for operating electrical controller 64, through link 59. 162' Figs. 33 and 34 is a small lever on this same rod 57, and when the member 15 engages the open link 55, it oscillates the shaft 57 and as the lever 162' is fixed to this shaft, it is also oscillated and from line $e'''$ to line $e''''$, Fig. 32. As the pin 191' on lever 162 rests on the under side of the link 155, as shown, the said lever is raised out of the rotary path of the pin 161 and the wheel 8 is immediately free to rotate for the purposes set out. Immediately, following the raising of the lever 155 off the said pin 161 the clutch jaws 5 and 6 become engaged through lever 66 being operated by the lug 68 engaging with lug 67, Fig. 10, which pulls lever 66, swinging clutch moving straddles 10, 10, and oscillating moving clutch jaw 6, as set out hereinbefore. I have already described how the arc shape contact 21 of dog 19—20 becomes disengaged from worm 14, whereupon chain 37, through weight 38, Figs. 1 and 6, will return part 15 back to any position at which it has been initially set for predetermining a cycle and on such return the bell 40 is sounded. I have also explained how the cam 54 will reseat the dog 19—20 automatically making the machine automatic and how by dispensing with this cam the lever 19—20 is hand manipulated. The automatic feature is desirable in materials that have a heavy volume of suspended solids, the hand manipulated construction being entirely efficient on materials having a very light volume of suspended solids such as defecated syrups in sugar refining. The holes HO in the link 90' and the holes $HO^2$ in the lateral flange of the frame 1 and the holes $HO^3$ in the top of the bed plate are all of substantially the same pitch, so when I adjust link 90' shorter to hole "an" by hooking it up to lever 89' in this hole I put the pivot pin holding the said lever 89' in hole "am" and move cam 54 to hole "ab," Figs. 35 and 36. In Fig. 36 as well as 35 the member 15 is shown in position to actuate push link 55. This push link is operated by the member 15. If it is arranged to have the extension of the U hook operate it, as it could be, the spring 29 must be strong enough to osciliate the lever 56 before rod 34 of the U hook is moved. If the U hook is not made to operate the push link 55 this spring 29 need only be of sufficient strength to snap over the handle at the proper time as already set out. The discharge ports shown in Fig. 30 are designed to reduce the volume of separating material held in the basket at will in the same machine. If the caps are in the position indicated by the cap 138' liquid will not pass out over the top of the basket until the liquid wall reaches the limit line of the top predetermined by the inner diameter of the basket top. If the caps are in the position as shown by 138 the separating liquid cannot build up a wall greater than shown at 144, likewise 143 and 145. These are all diagrammatic.

In Figs. 19 and 34 I show a modified way of operating the motor controller, as follows: 163 is a lever fixed on shaft 57 and 162 a companion lever. They carry a connecting link 164 having a dog N. The lever 162 is pivoted at 160' and the pins N" and N"' are substantially the same distance between their centers as 57 and 160'. The line N""' is the vertical line of movement for the end of the lug N on the link 164. N""" is a pin on the wheel 8 on the opposite side to pin 161 but not in transverse alinement. This pin N""" engages the lug N of the link 164 and pulls the lug N from line 11X to 12X just before the pin 161 changes the clutches 6 and 5 in disengagement. Therefore the speed of the motor will be accelerated just before the wheel 8 is stopped. It will be evident that as the lug N is pulling down the link 164 from line 11X to 12X the lever 163 will oscillate to line $e'''$ and the lever 58 will move from line 91, thus controlling the motor controller through the link 59. This modification would be used with the link 155, not at all interfering with the mechanism for unlocking the clutch jaws. It would be used where I want to gain time and on materials that have a heavy volume of solids in suspension, whereby a wall is quickly built on the basket shell.

It is scarcely necessary to say that the high and low speed of the motor is controlled by the controller 64. That line 200 indicates high speed oscillation of controller contacts; line 201 slow speed 100 R. P. M. and line 202 where all current is off and motor 203 at rest. I connect my motor to the basket shaft by a universal joint, not shown, being well known.

I do not limit myself to the specific features set out in any particular, but could make numerous modifications without departing from the spirit of my invention.

Having now described my invention what I claim as new and desire to secure by Letters Patent is:

1. In a centrifugal separating machine the combination of a basket, a bottom for the said basket having a central opening therein, means for rotating the said basket, an oscillating wall scraper and a co-acting bottom sweep, whereby as the material is scraped from the wall by the scraper it is placed on the basket bottom and caught by the sweep and conducted to the said opening and discharged from the basket centripetally.

2. In a centrifugal separating machine the combination of a basket, a bottom for said basket, means for giving said basket two speeds, said basket bottom having an opening therein, means to seal the opening at high speed, means to open said opening at slow speed and means to scrape the separated solids from the basket shell and sweep them centripetally through said opening at slow speed when so opened.

3. The combination in a centrifugal of a basket having a shell and a bottom, said bottom having an opening therein, means for giving the said basket two speeds, the high a separating speed, the slow a solids discharging speed, a cover for the said opening, means for lifting the said cover at slow speed, a shell scraper and a bottom sweep with means to put the said scraper and sweep in action at the slow speed.

4. In a centrifugal separating machine the combination of a basket having a bottom with a central opening therein, means for moving the material solids, after being liquid relieved, consisting of a means to maintain a predetermined slow speed, means to maintain the slow speed for a predetermined time and means to conduct the separated solids at the slow speed from the basket shell through the opening in the basket bottom, wherethrough it is discharged from the basket.

5. In a centrifugal separating machine the combination of a basket having a bottom, said bottom having a central opening therein and a shell, means to rotate said basket, a cover for said opening, a guide for the cover and means to raise the cover off the opening at a predetermined time, a shell sweep and a bottom cleaning conveyer, said conveyer sweeping the material scraped from the shell by the shell sweep and conducting it centripetally to said central opening.

6. In a centrifugal the combination of a basket having a bottom with a central opening therein and a shell, a cover for said opening, means to give said shell a separating speed, means to reduce the speed to a cleaning speed, means to maintain the slow speed for a predetermined time and means to remove the cover from said opening at the said reduced speed, a shell sweep and a bottom sweeping conductor, said conductor conveying material dislodged from the shell by the said shell sweep centripetally to the said opening at slow speed.

7. In a centrifugal separating machine the combination of a basket, having a cylindrical shell and a bottom, means for giving said basket a high separating speed, means for reducing the basket to a slow solids cleaning speed, a cover for said opening and means for raising said cover after the period of high speed and holding it raised at the period of slow speed, off said opening, a shell sweep and a co-acting bottom sweep, said bottom sweep conveying the material removed from the shell wall centripetally to the said opening.

8. In a centrifugal separating machine the combination of a basket having a shell and a bottom, said bottom formed of two parts, a means for giving said basket a high separating speed, means for giving said basket a slow cleaning speed, means for separating said parts and holding them apart during cleaning at slow speed thereby forming an exit passage for solids, means for scraping the basket shell at slow speed of the solids impacted thereon at the high speed and placing them on the unraised portion of the bottom and a bottom sweep conveying said material to the port formed by the raising of the movable portion of the basket.

9. In a centrifugal separating machine, the combination of a basket having a shell and a bottom, said bottom formed of a plurality of parts, means for giving said basket a high separating speed, means for giving said basket a slow cleaning speed and means for changing the position of said parts and holding them thus changed during cleaning at slow speed, thereby, forming a passageway for separated solids, means for scraping the said shell at slow speed and means for discharging said material so scraped from the said shell by a centripetally acting sweep.

10. In a centrifugal separating machine the combination of a basket having a shell and a bottom, said bottom having a central opening or passageway therein, a valve or seal for said opening, means for giving said basket a high separating speed, means to permit the said valve to cover said opening at the high speed, means for reducing said speed to a slow cleaning speed and means for conducting separated material from the basket shell to said opening during slow speed comprising a shell sweep and a bottom sweep co-acting therewith.

11. In a centrifugal separating machine the combination of a basket having a shell and a bottom, said bottom having a central opening therein, a supporting shaft for the said bottom, means for giving the said bottom and basket two predetermined speeds, the high a separating speed, the low a basket cleaning speed, a support for that part of the bottom which extends beyond the said central opening, means for supporting the said bottom to the said shaft, a lid or cover for the said central opening, in the bottom, said lid or cover sealing the said bottom at high basket speed, means for lifting the said lid or cover at low basket speed and a centripetally acting cleaner and unloading device, whereby the material solids separated at the high speed is removed from lodgment on the basket shell or wall at the low speed by said cleaner and conducted to the said central opening after the said lid or cover is lifted as set out.

12. In a centrifugal separating machine having a basket with an unperforated shell and means for rotating the said basket, a bottom in the said basket, an opening in the said bottom, a cover for the said opening forming thereby a valve, means to permit the said separated liquid to pass out over the top of the said basket, a liquid collector under the said opening in the basket bottom, means for raising the said cover at a predetermined time and means for moving said collector away from the vertical plane of the said opening at a predetermined time.

13. The combination in a centrifugal of a basket having a central port, a valve or cover for the said port and automatic means for raising the said valve at a predetermined time, whereby the action of the sweep is made effective, a bottom, a basket shell sweep comprising a central stem and scrapers adapted to engage the said shell and a bottom sweep carried by the said stem and adapted to sweep the bottom, whereby the said scrapers remove the separated solids from the shell wall and the bottom sweep engages the material thus removed and conducts it centripetally to the said central port.

14. In a centrifugal separating machine the combination of a basket having a circumferential shell, a bottom having a hole, means for giving said basket two speeds, the high a separating speed, the low a solids cleaning speed, means for putting separated solids on the basket bottom at slow speed and a bottom sweep whereby the solids are carried off the said bottom and conducted to said hole by said sweep.

15. The combination in a centrifugal separating machine of a basket having an unperforated shell, a bottom having a solids discharge port, a shell scraping and cleaning device and a centripetal bottom sweep co-acting therewith, a trap carried by said shell, whereby solids are prevented from passing out the basket while separating, a curb collecting chamber for separated liquid, surrounding and inclosing said basket, and a movable secondary collector under said port in the bottom, as and for the purpose set out.

16. In a centrifugal the combination of a basket having an unperforated shell and having a bottom with a central opening, a trap on the top or the shell, a curb chamber inclosing the shell, a cover for the said central opening, means to remove the said cover at a predetermined time, a movable liquid collector under the said cover and means to swing the said movable collector out of the vertical plane of the said central opening when the cover thereon is removed.

17. The combination in a centrifugal separator of a basket having a shell and a bottom with a central port in the latter, means for giving the said shell a high separating speed during which speed solids are separated from the liquid and the liquid passed from the basket by centrifugal action, means for reducing the said basket speed to a predetermined slow cleaning speed, a cleaning device for shell scraping and cleaning and comprising a shell wall sweep and a co-acting bottom sweep and whereby the solids as cleared from the wall are passed from the basket thereafter by centripetal action.

18. The combination in a centrifugal separator of a basket having an unperforated shell, a top for the said shell, a bottom for the said basket having a central opening therein, a curb chamber surrounding the said shell and inclosing it, a movable liquid collector under the said opening, means for moving the said collector away from the said opening at the conclusion of a purging period of basket rotation and means for discharging the separated solids through the said opening while the said collector is moved.

19. In a centrifugal separating machine, the combination with the basket, said basket having a bottom and a port therein, of a cleaner having a central stem pivoted beyond the zone of the port, said cleaner comprising a wall sweep and a bottom sweep, with means to oscillate the cleaner and whereby the wall sweep will engage the wall of the rotating basket toward the orbit of its rotation and the bottom sweep will be projected over the edge of the port in the basket bottom, thus conducting material from the shell to the said port centripetally, a supplemental movable liquid collector normally under said port and means to move the said collector during the time the bottom sweep is projected over the edge of the port in its material conducting function.

20. In a centrifugal separating machine the combination of a basket with a bottom port, having two predetermined speeds, a separating speed for liquid passage and a slow cleaning speed for solids discharge and a cleaning device adapted during high speed to be out of the zone of centrifugal activity and during slow speed to scrape the shell wall and to conduce the material after shell scraping centripetally to the inner port in the basket bottom, means to maintain the slow speed during the period of the action of the cleaning device.

21. The combination in a liquid separating apparatus for separating solids held in suspension in liquid and having different specific gravities of a centrifugal whereby the heavier portion of the solids are separated by gravity acceleration, means for feeding unseparated matter into the centrifugal, means for permitting and discharging the liquid from the centrifugal after being relieved of its heavier suspended solids and means to pass the solids from the basket after each period of a purge, comprising an oscillating cleaner forming both a basket shell sweeper and a bottom sweeper, said sweeper passing the solids from the basket shell to the port in the basket bottom by centrifugal action, means to conduct residuum liquid in the basket at the end of a separating period comprising a collector under the basket and a liquid conductor from the basket to the said collector.

22. The combination in a centrifugal of a basket having an unperforated shell, a bottom with a central hole and a top, said basket having a high separating speed and a slow cleaning speed, means to maintain said speeds for predetermined periods, a cleaner and a conductor for conducting separated solids from the basket at slow speed and a liquid collector for residuum collecting, and means for holding the said collector under the basket at a predetermined time and means for holding the said collector away from the basket zone at a predetermined time, as and for the purpose set out.

23. In a centrifugal basket having an unperforated shell, a top and a bottom with perforated shell, a top and a bottom with means to rotate the said basket, a central opening in the bottom of the said basket forming an egress passageway in combination with a liquid collector normally in the vertical plane of the said port and means to change the position of the collector and move it away from the zone of the port, whereby the solids can be passed through the said port without passing into the said collector.

24. In a centrifugal separating machine having unperforated walls forming the basket shell, means to give the basket two speeds, one a high or separating speed, means to control and reduce the speed of the basket to its low basket cleaning speed, means to open the normally sealed port in the basket at the slow speed, means to pass the separated solids out of the basket port at the slow speed, and means to pass the residuum liquid out of the said port also at the slow speed and before the said solids are so discharged and a basket shell scraper and bottom sweep to conduct the said solids from the shell wall over the bottom to the said port at the slow speed.

25. In a centrifugal for separating solids and liquids in a basket, means to rotate said basket, a cleaner for said basket, a means to oscillate said cleaner and a resilient link connecting said cleaner with its operating means comprising a main central stem, a sleeve in which the said stem is incased and a spring in the said sleeve encoiling the said central stem.

26. In a centrifugal separating machine the combination of a basket having a shell, adapted to receive separated solids, said basket having a bottom with an opening for solids discharge, a shell scraper, means for putting and holding said scraper in the zone of scraping activity during the cleaning function, means for reducing the basket speed and means for maintaining a slow speed during the said cleaning function, and a sweep conducting the material as scraped from the basket shell to said opening at the reduced speed, said sweep having a central stem, a wall scraper carried by the said stem and a bottom sweep co-acting with the said scraper in removing the material from the basket shell over the basket bottom to the opening therein.

27. A cleaning device for a centrifugal separating machine having a basket with a bottom port and means to give the said basket a predetermined slow speed, means for maintaining said slow speed for a predetermined time and a basket cleaning device, and comprising a wall speed and a bottom sweep with means to put the said sweeps in engagement respectively with the said wall and bottom and whereby the basket is cleaned and the material conducted to the said port centripetally, as set out.

28. In a centrifugal separating machine having a basket with a bottom having a port therein for separated solids discharge, means to give said basket a high separating speed, means to give said basket a slow speed and means to sweep the bottom and conduct the separated material from the basket centripetally to the basket port while open, means to open and to hold said port open at slow speed, and means to close said port and hold it closed at separating speed.

29. In a centrifugal separating machine having a basket shell and bottom, said bottom having a solids discharge port therein and means to give said basket two predetermined speeds the high a separating, the low a cleaning speed, a part of said bottom constitutes a valve or cover for said port, a cleaner carrying a bottom sweep means to swing the cleaner in engagement with the basket shell removing the solids thereon impacted and means to conduct the solids by the bottom sweep to the said port at slow speed.

30. The combination in a centrifugal having a basket shell and bottom, and a port in the bottom, a lid or cover for said port, a lifting device for said cover and a connection between said lifting device and the said cover comprising a sleeve having an upper circumferential flange and yielding lifting fingers and means for lifting the said fingers and therethrough the said lid or cover.

31. In a centrifugal separating machine having a basket, means for giving the said basket speed, means to intermittently reduce the speed to a predetermined low speed and means to regulate the period for the said two speeds, comprising a worm, a contact carrier carried by said worm and operated thereby said contact carrier controlling the basket operating means.

32. The combination in a centrifugal having a basket with a high separating speed and means for maintaining the said speed for variable and predetermined periods comprising a worm, means to rotate the worm, a tripping device carried by the worm, a prime mover and a connection between the tripping device and the worm.

33. In a centrifugal separating machine, having a basket with means to give the said basket two predetermined speeds, a speed controller, a time predetermining device for machine cycle periods and a cycle signal for indicating cycle conclusions, whereby the controller regulates the cycle periods and the signal announces their conclusion.

34. In a centrifugal separating machine having a basket, means for rotating the said basket at two predetermined speeds, a time indicating series of numerals for high speed period predeterminations, a worm, a finger carried on a support operated by the said worm, whereby separating periods are predetermined, means for locking the finger to the worm at a predetermined time and means for unlocking the said finger from the said worm at a predetermined time, and means for reseating the said finger support after each period of arrested high speed, as set out.

35. In a centrifugal separating machine having a basket with two independent and predetermined speeds, a motor and a motor controller for the said speeds, means for regulating the controller comprising a worm, means to actuate the worm, a contact carrier carried by and operated by the worm, and means for connecting the said contact with the controller at the conclusion of its predetermined movement.

36. In a centrifugal having a basket with means to give the said basket two predetermined speeds, the high speed its separating speed and the slow its solids discharging speed, a controller for the said two speeds comprising a worm, an indicator carried by the said worm, a regulator for the period of the said two speeds, a connection between the carrier and the said regulator established at the end of the movement of the carrier and end of the high speed and disconnected during the high speed period of rotation.

37. In a centrifugal having a basket with means to give the said basket two speeds in its cycle, a speed regulator and controller, a time regulator controlling the said speed regulator comprising a worm feed, a carrier on the said worm, an indicator on the said carrier, a regulator operating element and means to control the said regulator by the said carrier by contact at a predetermined point in the cycle of its movement and of the machine.

38. The combination in a centrifugal machine of a basket, means to operate the said basket, means to predetermine a complete cycle of movements of the basket, a signal to indicate the conclusion of the cycle comprising a bell, an electrical circuit in which the said bell is placed and a circuit controller, said controller closing the bell circuit at the conclusion of each machine cycle.

39. In a centrifugal separating machine with means to operate the basket thereof for predetermined functions, the combination with a signal device and means to operate the said signal device at the conclusion of the said basket comprising a worm, a carrier on the said worm, an indicator on the said carrier, means to return the said carrier to its initial position on the worm after a full predetermined movement and a signal contact established at this time.

40. In a centrifugal having a basket with means to feed the said basket, means to operate the said basket to a high purging speed and a slow cleaning speed and means to clean the basket at the slow speed in combination with a cycle annunciator comprising an annunciator operator, a means to operate the said operator and a means to synchronically arrest the operation of the basket whereby when the different functions are accomplished and the said annunciator is put in action.

41. In a centrifugal having a basket with means to feed, clean and regulate the said basket, in combination with a signal bell, and means to ring the said bell at an electrical circuit, a circuit closing device and means to operate the circuit closing device at a predetermined time.

42. In a centrifugal machine the combination of a basket, means to operate the said basket, an indicator to indicate separating periods, a signal device, means to actuate the said signal device at the conclusion of a machine cycle, or separating period comprising a bell having an electrical circuit, a circuit closing device, a worm carrying the said circuit closing device, means for locking the said device to said worm during basket high speed rotation and means for unlocking the said device after high speed rotation and means for moving said device to close the bell circuit after being so unlocked.

43. The combination in a centrifugal separating machine of a basket, a cleaner for the said basket comprising a central stem and a basket shell scraping arm carried by the said stem, a bottom in the said basket having a central opening therein for solids discharge, a cover for the said opening and means for putting the said cleaner in action synchronously with the raising of the said cover, an under basket residuum collector for partially unseparated liquids and means to move the said collector from its normal vertical plane during the time the cleaner is in action.

44. In a centrifugal separating machine the combination of a basket, a motor, a motor controller or regulator, means to operate the regulator to variable periods, means to lock the regulator to its operating mechanism while the motor is operating at separating speed and means to unlock the regulator from its operating mechanism after it has regulated the motor for reduced speed.

45. In a centrifugal having a speed regulating mechanism in combination with the basket of a motor, a motor controller, a time predetermined device for high speed periods comprising an indicator, a worm, a motor controller carried by the worm, means for unlocking the controller from the worm at the conclusion of a separating period, means for returning the controller to its initially adjusted position after being so unlocked.

46. The combination in a centrifugal of a basket having a discharge port, a cleaner for the said basket, means to put the cleaner into and out of action, a curb chamber for liquid collecting, a supplemental collector, normally in the zone of said discharge port, and means for oscillating the said supplemental collector out of the zone of the said port while the said cleaner is being put in action.

47. The combination in a centrifugal of a basket having a discharge port, a curb chamber for collecting separated liquid, a supplemental liquid collector under the basket under the discharge port, and means for moving the said supplemental collector at the conclusion of a purge away from the zone of the said port.

48. The combination in a centrifugal of a basket, having a central opening in the said basket, a cover for the said opening, a shaft passing into and through the said opening by which the said basket is supported, a sleeve incasing the said shaft and carrying the said cover, means for suspending the said shaft, an annular flange carried by the said sleeve at the upper end thereof and a lifting device engaging the said flange on the operation of which the said valve is opened, comprising expandible and oscillating fingers or levers and a movable support for the said fingers.

49. The combination in a centrifugal of a basket, means to operate and support the said basket, said basket having a central port therein, a cover for the said port, a cleaner held by a vertical stem, means to oscillate the said cleaner at a predetermined time and a connection between the said cleaner and the said cover, whereby as the cleaner is oscillated the cover of the port is lifted as and for the purpose set out.

50. The combination in a centrifugal having a basket with a port for solids discharge, a cover for the said port, flexibly mounted fingers for lifting the said port at a predetermined time and a connection between the said cover and the said fingers.

51. The combination in a centrifugal of a basket having a port for solids passing, said basket being suspended thus permitting eccentricity of rotation, a cover for the said port, a flexible lifting device for the said cover, a fixed support for the said lifting device and means for lifting the said support.

52. In a centrifugal separating machine and in combination with the basket having an opening therein and the curb chamber a pivoted liquid collector under the said opening and means for oscillating the said collector at a predetermined time.

53. In a centrifugal separating machine and in combination with the basket and the curb chamber for collecting the drained liquid, means for periodically discharging from the basket the material separated from the said liquid, of a supplemental collector, a support therefor and means for changing the position of the said supplemental collector at a point in the machine cycle, whereby solids can pass without being discharged into said collector.

54. In a centrifugal separating machine the combination with the basket and the curb chamber, of a supplemental collector, a pivoted support therefor and means for oscillatably moving the said supplemental collector at a predetermined time.

55. In a centrifugal separating machine the combination with the basket of a cleaner, a valve in the bottom of the said basket, a curb chamber, a supplemental liquid collector means to open the said valve and put the said cleaner in action for solids discharge through the said valve and means to move the said supplemental collector from the zone of the valve, as and for the purpose set out.

56. In a centrifugal separating machine the combination with the basket of a cleaner, a valve in the basket bottom, a curb chamber for collecting liquid primarily drained, a supplemental liquid collector, a conductor from the said basket to the said supplemental collector, means to move the said supplemental collector at a predetermined point in the machine cycle and means to substantially synchronize the movements of the said cleaner, valve and the supplemental collector.

57. In a centrifugal separating machine the combination of a basket having a bottom and a port in the said bottom, said basket having an unperforated shell and a top liquid passage carried by the said shell wherethrough separated liquids can pass, a cleaner for solids discharge, means for putting the said cleaner in cleaning action, a supplemental liquid collector under the said port normally, means for moving the said collector away from the said port while the said cleaner is moving to cleaning position.

58. In a centrifugal separating machine the combination of a basket having a bottom and a port in the said bottom, said basket having an unperforated shell and a top liquid conductor, a cleaner adapted to conduct separated solids from the said shell to the said port at a certain point in the machine cycle, a suppplemental liquid conductor for partially unseparated material normally under the said port and means for moving the said supplemental conductor away from the zone of the said port synchronically with the movement of the said cleaner to cleaning action or position.

59. In a centrifugal separating machine having a basket with an unperforated shell, a bottom with a port, means for conducting separated liquid from the said shell during the separating period of basket rotation, a supplemental collector for a residuum mass of unseparated liquid remaining in the said basket at the conclusion of each separating period, and means for conducting this unseparated material from the basket to the said collector at the conclusion of each separating period in the machine cycle, and means thereafter for changing the position of the said collector whereby solids can be passed through the said port without being deposited in the said supplemental collector.

60. In a centrifugal separating machine the combination of the basket having an imperforated wall, a valve in the said basket centrally located, a curb chamber, a supplemental liquid collector under the valve, a means to move the said supplemental collector from its normal position and a bottom sweep for the said basket, whereby the solids as separated are impacted on the basket shell and the liquids as separated are carried thereover and the unseparated liquid, at the conclusion of a separating period that remains in the basket, is passed through the said valve to the said collector and thereafter the said sweep will sweep the solids through the said valve after the said supplemental collector has changed its position, under the zone of the valve.

61. In a centrifugal the combination of the basket having a feeding means and cleaning means and an unperforated shell, and means for retaining unseparated material in the said basket for a limited time, a curb collector wherein separated liquid is discharged and a movable supplemental collector, wherein partially unseparated liquid can be discharged from the basket prior to the solids passing therefrom through the action of the cleaner.

62. A supplemental liquid collector for a centrifugal having an unperforated basket with top liquid discharge for separated liquid and having a bottom port therein for solids passing, said collector located under the said port and means to change the position of the said collector when the liquid relieved solids are passing through said port.

In testimony whereof I affix my signature in presence of two witnesses.

HOMER A. HERR.

Witnesses:
FRANCIS P. MALONE,
M. D. HERR.